(12) United States Patent
Imamura et al.

(10) Patent No.: US 9,189,112 B2
(45) Date of Patent: Nov. 17, 2015

(54) TOUCH PANEL DEVICE AND DISPLAY DEVICE WITH TOUCH PANEL DEVICE

(75) Inventors: Koichi Imamura, Chiyoda-ku (JP); Haruhiko Ito, Chiyoda-ku (JP); Koki Ikeda, Chiyoda-ku (JP)

(73) Assignee: TEIJIN CHEMICALS LTD., Tokyo (JP)

( * ) Notice: Subject to any disclaimer, the term of this patent is extended or adjusted under 35 U.S.C. 154(b) by 222 days.

(21) Appl. No.: 13/821,471

(22) PCT Filed: Sep. 8, 2011

(86) PCT No.: PCT/JP2011/070510
§ 371 (c)(1),
(2), (4) Date: Mar. 7, 2013

(87) PCT Pub. No.: WO2012/033169
PCT Pub. Date: Mar. 15, 2012

(65) Prior Publication Data
US 2013/0169593 A1    Jul. 4, 2013

(30) Foreign Application Priority Data
Sep. 8, 2010 (JP) ................. 2010-200753

(51) Int. Cl.
*G06F 3/044* (2006.01)
*G06F 3/041* (2006.01)
*G02F 1/1333* (2006.01)

(52) U.S. Cl.
CPC .............. *G06F 3/044* (2013.01); *G06F 3/0412* (2013.01); *G02F 1/13338* (2013.01)

(58) Field of Classification Search
None
See application file for complete search history.

(56) References Cited

U.S. PATENT DOCUMENTS

| 4,696,860 | A | * | 9/1987 | Epperson | ............ 428/325 |
| 6,037,395 | A | * | 3/2000 | Enomoto | ............ 524/97 |

(Continued)

FOREIGN PATENT DOCUMENTS

| EP | 1 850 214 A2 | 10/2007 |
| EP | 1870799 A1 | 12/2007 |

(Continued)

OTHER PUBLICATIONS

International Search Report for PCT/JP2011/070510 dated Oct. 11, 2011.

(Continued)

*Primary Examiner* — Antonio Xavier
(74) *Attorney, Agent, or Firm* — Sughrue Mion, PLLC

(57) ABSTRACT

Provided is a touch panel device which prevents a problem such as generation of Newton's rings even if an air layer between the touch panel device and a display device has a small thickness. This capacitance type touch panel device (100) includes: a protective transparent base (10) having an observation-side surface and a display device-side surface; and two polymer films with position detection electrode layers (20$b$, 22; 30$b$, 32) which are arranged on the display device-side surface of the protective transparent base. The difference between the minimum value and the maximum value of the linear expansion coefficients in the surface direction of all the polymer films (20$b$; 30$b$) arranged on the display device-side surface of the protective transparent base is $10.0 \times 10^{-6}$ cm/cm·° C. or below. Furthermore, the display device with a touch panel device (100, 200, 300) according to the present invention has such a touch panel device.

4 Claims, 4 Drawing Sheets

(56) References Cited

U.S. PATENT DOCUMENTS

| | | | |
|---|---|---|---|
| 6,222,003 B1* | 4/2001 | Hosoi et al. | 528/196 |
| 6,507,337 B1* | 1/2003 | Sato et al. | 345/173 |
| 6,572,941 B1* | 6/2003 | Murakami et al. | 428/34 |
| 6,620,509 B1* | 9/2003 | Yamamoto et al. | 428/412 |
| 6,629,833 B1* | 10/2003 | Ohya et al. | 425/458 |
| 6,841,190 B2* | 1/2005 | Liu et al. | 427/64 |
| 7,030,860 B1 | 4/2006 | Hsu et al. | |
| 2002/0157864 A1* | 10/2002 | Koyama et al. | 174/261 |
| 2002/0180712 A1 | 12/2002 | Sato et al. | |
| 2003/0012955 A1* | 1/2003 | Iwabuchi et al. | 428/408 |
| 2003/0030626 A1* | 2/2003 | Matsuda et al. | 345/173 |
| 2003/0222857 A1* | 12/2003 | Abileah | 345/173 |
| 2004/0017364 A1* | 1/2004 | Tanaka et al. | 345/173 |
| 2005/0237307 A1* | 10/2005 | Hieda et al. | 345/173 |
| 2006/0013967 A1* | 1/2006 | Mikoshiba et al. | 428/1.1 |
| 2008/0165158 A1 | 7/2008 | Hotelling et al. | |
| 2009/0002323 A1* | 1/2009 | Shiroishi et al. | 345/173 |
| 2009/0160819 A1 | 6/2009 | Sasaki et al. | |
| 2009/0213092 A1 | 8/2009 | Kuo et al. | |
| 2009/0252897 A1* | 10/2009 | Matsuo et al. | 428/1.31 |
| 2009/0266625 A1 | 10/2009 | Yoshikawa | |
| 2009/0315849 A1* | 12/2009 | Ito | 345/173 |
| 2010/0015541 A1* | 1/2010 | Ogawa | 430/59.6 |
| 2010/0171718 A1 | 7/2010 | Denda | |
| 2011/0001721 A1* | 1/2011 | Chiang et al. | 345/174 |
| 2011/0064942 A1* | 3/2011 | Sawada et al. | 428/328 |
| 2011/0236682 A1* | 9/2011 | Okamoto et al. | 428/355 CN |
| 2013/0082970 A1* | 4/2013 | Frey et al. | 345/173 |

FOREIGN PATENT DOCUMENTS

| | | |
|---|---|---|
| JP | 2002-189565 A | 7/2002 |
| JP | 2003-511799 A | 3/2003 |
| JP | 2004-77887 A | 3/2004 |
| JP | 2005-18551 A | 1/2005 |
| JP | 2009-265924 A | 11/2009 |
| JP | 2010-55944 A | 3/2010 |
| JP | 2010-160670 A | 7/2010 |
| JP | 2010-162746 A | 7/2010 |
| WO | 01/27868 A1 | 4/2001 |
| WO | 2006/028131 A1 | 3/2006 |

OTHER PUBLICATIONS

Search Report dated Jul. 18, 2014 from the European Patent Office in counterpart European Application No. 11823643.9, corresponding to U.S. Appl. No. 13/821,471.

* cited by examiner

TOUCH PANEL DEVICE AND DISPLAY DEVICE WITH TOUCH PANEL DEVICE

TECHNICAL FIELD

The present invention relates to a touch panel device, and more particularly an electrostatic capacitance-type touch panel device. Further, the present invention relates to a display device equipped with a touch panel device.

BACKGROUND ART

Display devices equipped with touch panel devices, e.g. liquid crystal displays equipped with touch panel devices, are used for mobile phones and other mobile electronic devices, consumer electronics, and unmanned reception devices and other stationary-type customer assistance terminals.

As touch panel devices, contact film types, electrostatic capacity types, photosensor types, etc. are known. Among these, electrostatic capacitance-type touch panel devices are excellent in transmission rate of light from the display devices, durability, etc. Further, electrostatic capacitance-type touch panel devices are excellent in the point that they enable multipoint detection (multi-touch) by arranging, as a vertical and horizontal two-dimensional matrix, two types of position-detecting electrodes consisting of vertical position-detecting electrodes and horizontal position-detecting electrodes (Patent Document 1).

Incidentally, in a display device equipped with a touch panel device, the touch panel device is not entirely bonded to the display surface of the display device. Rather, in the general practice, an air layer of about 0.5 to 1.0 mm is provided between the touch panel device and display device (Patent Documents 2 and 3).

The reasons of providing an air layer of about 0.5 to 1.0 mm between the touch panel device and the display device are, e.g., the following (1) and (2):

(1) Since a touch panel device and a display device differ in production conditions, it is difficult or impossible to integrally produce the touch panel device and the display device so as to completely eliminate any clearance. Further, when the touch panel device and the display device are not integrally produced, if it is found, at the final stage of production, that the touch panel device does not suitably work, it is possible to detach the touch panel device, which does not suitably work, from the display surface of the display device, and exchange it with a new touch panel device. Therefore, the touch panel device and the display device are preferably not integrally produced.

(2) If the thickness of the air layer between the touch panel device and the display device is too small, the light reflected at the interface between the touch panel device and the air layer (i.e., the top side interface of the air layer), and the light reflected at the interface between the display device and the air layer (i.e., the bottom side interface of the air layer) interfere with each other, and thereby Newton rings (moire) are formed. Incidentally, when the thickness of the air layer between the touch panel device and the display device is sufficiently large, e.g. when the thickness of the air layer is about 1.0 mm, the difference in paths of the reflected lights, which are respectively reflected at the top and bottom side interfaces of the air layer, is large, and therefore no interference substantially occurs.

Regarding the Newton ring-formation problem in item (2) above, Patent Documents 2 and 3 propose to fill the air layer between the touch panel device and the display device with a resin material to form a resin layer, and thereby eliminate reflection at the top and bottom side interfaces of the air layer.

However, when filling with a resin material, even if finding, at the final stage of production, that the touch panel device does not suitably work, it is sometimes difficult to detach the touch panel device, which does not suitably word, from the display surface of the display device, and exchange it with a new touch panel device. Further, when filling with a resin material, it is sometimes difficult to fill it with preventing air bubbles from entering into the resin material. Still further, when filling with a resin material, naturally the weight increases.

Further, regarding the Newton ring-formation problem in item (2) above, Patent Document 3 proposes to provide unevenness to the surface of the touch panel device and the air layer-side surface of the display device, and thereby prevent reflection at the top and bottom side interfaces of the air layer.

However, when providing unevenness to the air-layer-side surfaces with unevenness, there is a problem of increasing in the haze due to the unevenness.

PRIOR ART DOCUMENTS

Patent Documents

Patent Document 1: Japanese Unexamined Patent Publication No. 2003-511799 A1
Patent Document 2: Japanese Unexamined Patent Publication No. 2004-77887 A1
Patent Document 3: Japanese Unexamined Patent Publication No. 2002-189565 A1

SUMMARY OF INVENTION

Technical Problem

In recent years, along with lighter weight of display devices equipped with touch panel devices, greater thinness thereof is also demanded. Therefore, it is preferable to make the thickness of the air layer between the touch panel device and the display device smaller. However, as described in item (2) above, it is known that if the thickness of the air layer between the touch panel device and the display device is too small, the Newton ring-formation problem, etc. arises. Therefore, the present invention provides a touch panel device and a display device equipped with a touch panel device, which prevent problems such as the Newton ring-formation problem, even when making the thickness of the air layer between the touch panel device and the display device is smaller.

Solution to Problem

The electrostatic capacitance-type touch panel device of the first present invention comprises a protective transparent substrate having a viewing-side surface and a display device-side surface, and two polymer films having position-detecting electrode layers and located at the display device-side surface of the protective transparent substrate; and a difference between minimum and maximum values of a planar-direction linear expansion coefficient of all polymer films located at the display device-side surface of the protective transparent substrate is $10.0 \times 10^{-6}$ cm/cm·° C. or less.

The electrostatic capacitance-type touch panel device of the second present invention comprises a protective transparent substrate having a viewing-side surface and a display device-side surface, two polymer films having position-detecting electrode layers and located at the display device-side surface of the protective transparent substrate, and a polarizing plate located at the display device-side surface of the protective transparent substrate; and a total retardation (phase difference) of all layers located at the display device side from the polarizing plate is approximately λ/4 with respect to 550 nm wavelength light.

Advantageous Effects of Invention

According to the touch panel device of the present invention, and the display device equipped with a touch panel device of the present invention, even when the thickness of the air layer between the touch panel device and display device is small, the Newton ring formation problem, etc. is prevented.

DESCRIPTION OF EMBODIMENTS

Figure 1:
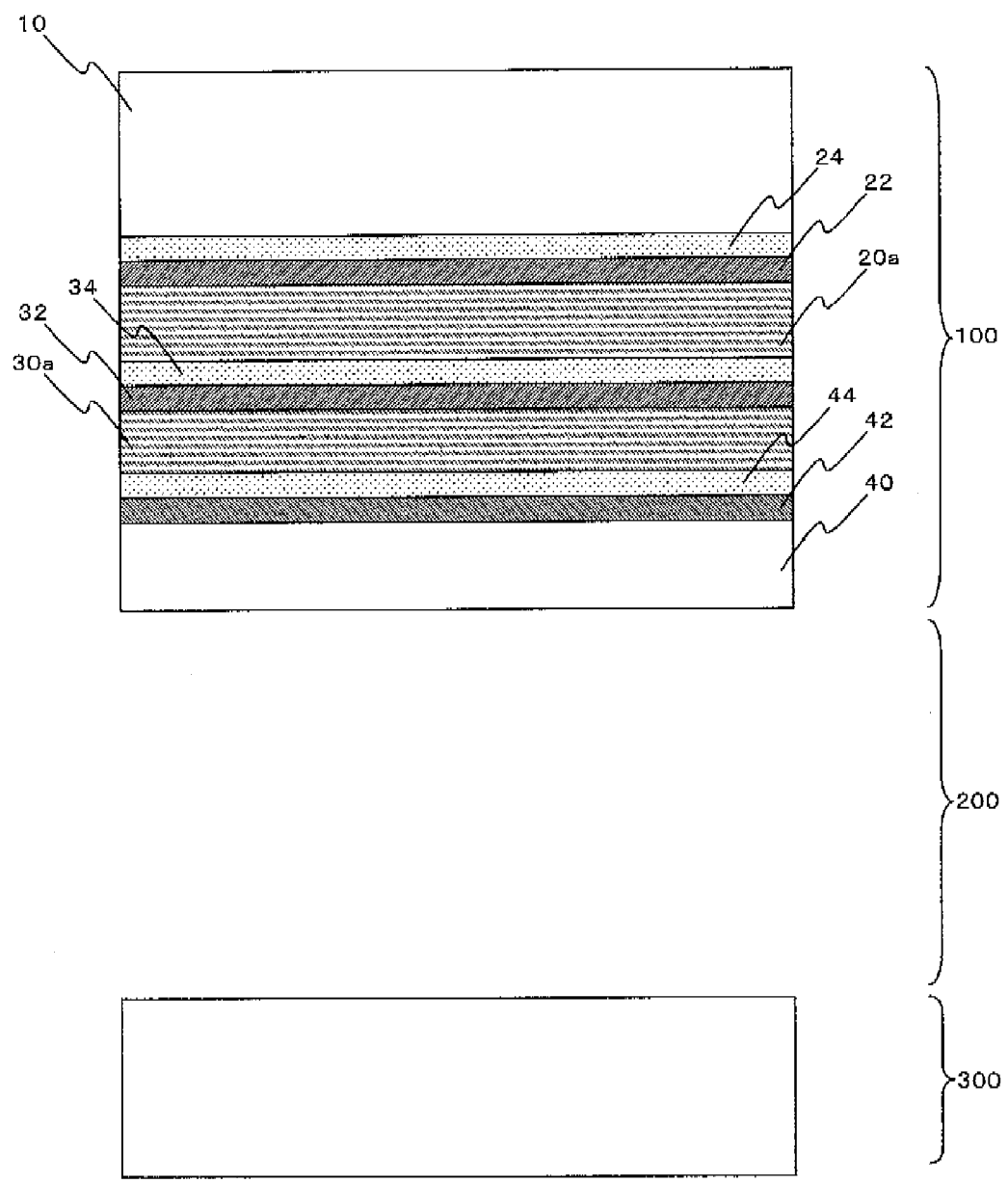
FIG. 1 is a conceptual view showing the configuration of a display device equipped with a touch panel device of a reference example.

<Electrostatic Capacitance-Type Touch Panel Device of First Present Invention>

The electrostatic capacitance-type touch panel device of the first present invention comprises a protective transparent substrate having a viewing-side surface and a display device-side surface, and two polymer films having position-detecting electrode layers and located at the display device-side surface of the protective transparent substrate; and a difference between minimum and maximum values of a planar-direction linear expansion coefficient of all polymer films located at the display device-side surface of the protective transparent substrate is $10.0 \times 10^{-6}$ cm/cm·°C. or less, $8.0 \times 10^{-6}$ cm/cm·°C. or less, $6.0 \times 10^{-6}$ cm/cm·°C. or less, or $5.0 \times 10^{-6}$ cm/cm·°C. or less.

Incidentally, the thermal expansion coefficient of the polymer film is measured in a temperature range in which the touch panel device is intended to be used, e.g. in a temperature range of 20° C. to 60° C.

According to the first electrostatic capacitance-type touch panel device of the present invention, even in the case of a temperature change, stress due to the difference in planar-direction linear expansion coefficient of the polymer films located at the display device-side surface of the protective transparent substrate can be prevented, and thereby the formation of fine unevenness can be prevented. Therefore, according to the first electrostatic capacitance-type touch panel device of the present invention, even if the thickness of the air layer between the touch panel device and the display device is small, it is possible to prevent the formation of Newton rings due to interference caused by reflection at the top and bottom side interfaces of the air layer.

Regarding this aspect, the planar-direction linear expansion coefficient of the adhesive located between the polymer film layers is preferably made similar to that of the polymer films. However, in practice, the adhesive located between the polymer film layers is generally thin, and small in elasticity, so the effect of linear expansion of the adhesive can substantially be ignored. Therefore, the planar-direction linear expansion coefficient of the adhesive may be similar to, or may be substantially different from that of the polymer films.

The protective transparent substrate may be any transparent substrate which can protect the touch panel device from the pressure, etc. caused when a user uses the touch panel device. This protective transparent substrate may be, e.g., a glass substrate, polymethyl methacrylate substrate, polycarbonate substrate, or combination thereof. If this protective transparent substrate undergoes deflection during the use of the touch panel device, the thickness of the air layer between the touch panel device and the display device would locally change, and Newton rings may be formed. Therefore, the protective transparent substrate used is preferably a rigid substrate, in particular a glass substrate.

Further, this protective transparent substrate has a thickness of, e.g., 0.1 mm or more, 0.2 mm or more, or 0.3 mm or more; and 2.0 mm or less, 1.0 mm or less, or 0.8 mm or less.

The polymer films used in the touch panel device of the present invention may be any polymer films having high transparency and surface smoothness. As the resin forming the polymer films, e.g. polycarbonate, polyethylene terephthalate, polyethylene naphthalate, noncrystalline polyolefin, cellulose triacetate or other cellulose-based resin, polystyrene, polyether sulfone, polysulfone, etc. may be mentioned. Among these, from the balance of the heat resistance, transparency, mechanical properties, etc., a polycarbonate resin is preferable.

Further, the thicknesses of the polymer films may be, e.g., 0.01 mm or more, 0.02 mm or more, or 0.03 mm or more; and 1.0 mm or less, 0.5 mm or less, or 0.3 mm or less.

The position-detecting electrode layers used in the touch panel device of the present invention may be any patterned transparent electrode layers. Such transparent electrode layers may be made of a transparent conductive material, e.g. indium oxide-tin.

The touch panel device of the first present invention further comprises a polymer film having an electromagnetic wave-shielding electrode layer and located at the display device-side surface of the protective transparent substrate. This polymer film having an electromagnetic wave-shielding electrode layer may be located at the display device side from the two polymer films having position-detecting electrode layers.

According to this aspect, the polymer film having an electromagnetic wave-shielding electrode layer is used to shield against electromagnetic waves emitted from the display device, and thereby prevent electromagnetic waves from undesirably affecting on position detection by the position-detecting electrode layers.

As the polymer film used in this aspect, it is possible to refer to the description relating to the above polymer films.

The electromagnetic wave-shielding electrode layer used in this aspect may be any electrode layer which can shield against electromagnetic waves, in particular may be a layer of a transparent conductive material having a uniform thickness, e.g. a layer of indium oxide-tin.

The touch panel device of the first present invention may further have a display device-side protective transparent substrate, which is located at a display device-side surface of the protective transparent substrate. The display device side protective transparent substrate may be located at the most display device side.

According to this aspect, by arranging rigid protective transparent substrates at both sides of the viewer side and the display device side of the touch panel device, the rigidity of the touch panel device can be enhanced more. Even if strongly pressing a finger against the touch panel device to operate it, the touch panel device can be prevented from undergoing a deflection and contacting the display device, or from damaging the display device.

As the material and thickness of this display device side protective transparent substrate, the above description relating to the protective transparent substrate can be referred to.

Incidentally, the touch panel device of the first present invention has, in addition to the features of the touch panel device of the above first present invention, the features disclosed in relation to the touch panel device of the second present invention, i.e., the features of the electrostatic capacitance-type touch panel device, which comprises a polarizing plate located at the display device-side surface of the protective transparent substrate, and has the total retardation of all layers located at the display device side from the polarizing plate of approximately $\lambda/4$ with respect to 550 nm wavelength light.

<Display Device Equipped with Touch Panel Device of First Present Invention>

The display device equipped with a touch panel device of the first present invention has the electrostatic capacitance-type touch panel device of the first present invention, which is arranged on a display surface of a display device via an air layer. The thickness of the air layer is 0.500 mm or less, 0.400 mm or less, 0.300 mm or less, 0.200 mm or less, or 0.100 mm or less.

According to the display device equipped with a touch panel device of the first present invention, even though the thickness of the air layer is thin, and thereby the thickness of the display device equipped with a touch panel device as a whole is thin, formation of Newton rings can be prevented.

The display device, which is used in the display device equipped with a touch panel device of the first present invention, may be any display device, e.g. may be a liquid crystal display, organic EL (electroluminescence) display, inorganic EL display, CRT display, field emission display (FED), electronic paper, or plasma display.

<Electrostatic Capacitance-Type Touch Panel Device of Second Present Invention>

The electrostatic capacitance-type touch panel device of the second present invention comprises a protective transparent substrate having a viewing-side surface and a display device-side surface, two polymer films having position-detecting electrode layers and located at the display device-side surface of the protective transparent substrate, and a polarizing plate located at the display device-side surface of the protective transparent substrate. The total retardation of all layers located at the display device side from the polarizing plate is approximately $\lambda/4$ with respect to 550 nm wavelength light.

According to this aspect, even when reflection occurs at the top and bottom side interfaces of the air layer, the polarizing plate and $\lambda/4$ retardation prevent the lights reflected at the top and bottom side interfaces of the air layer from being emitted from the protective transparent substrate side, so formation of Newton rings can be prevented.

Specifically, according to this aspect, outside light, which enters from the viewing-side surface of the protective transparent substrate, passes a transmission axis of the polarizing plate, and thereby is linearly polarized in one direction. This linearly polarized light undergoes a $\lambda/4$ retardation, and becomes circularly polarized light. Further, the light is reflected at the interface with the air layer to undergoes a $\lambda/4$ retardation again, and returns to linearly polarized light.

According to this, the reflected light undergoes a $\lambda/2$ retardation from the linearly polarized light when entering, and thereby it becomes linearly polarized light having a 90° different angle, so can be absorbed by the absorption axis of the polarizing plate. Incidentally, for this purpose, the angle between the absorption axis of the polarizing plate and the phase retardation axis of the polymer film having the $\lambda/4$ retardation can be made within 45°±5°, in particular within 45°±1°.

In order to make the total retardation of all layers located at the display device side from the polarizing plate to be approximately $\lambda/4$ with respect to 550 nm wavelength light, it is possible to make the total retardation of the two polymer films having position-detecting electrode layers, as well as any other optional polymer films, approximately $\lambda/4$ with respect to 550 nm wavelength light.

This means, e.g., that it is possible to make one polymer film having a position-detecting electrode have a $\lambda/4$ retardation with respect to 550 nm wavelength light, and make the other polymer film have no retardation. Further, it is possible to make the two polymer films having position-detecting electrode layers have total retardation of approximately 0 with respect to 550 nm wavelength light, and make the other polymer film have an approximately $\lambda/4$ retardation with respect to 550 nm wavelength light. Alternatively, it is possible to make both of the two polymer films having position-detecting electrode layers have no retardation, and make the other polymer film have an approximately $\frac{2}{4}$ retardation with respect to 550 nm wavelength light.

The "550 nm wavelength light" is light which is most strongly felt by the human eye. Therefore, making the total retardation of all layers approximately $\lambda/4$ of the 550 nm wavelength light can prevent the formation of Newton rings most effectively. However, the total retardation of all layers is preferably approximately $\lambda/4$ for other wavelengths of the visible light region as well. A general polymer film has a larger retardation for a shorter wavelength light (i.e., has a positive wavelength dispersion), so it is generally difficult to make the total retardation of all layers approximately $\lambda/4$ over the visible light region as a whole. However, by using a polymer film having a wavelength dispersion wherein the retardation becomes smaller for a shorter wavelength light (i.e., a reverse wavelength dispersion), such as those shown in Japanese Unexamined Patent Publication No. 2000-137116 A1, the total retardation of all layers can be made approximately $\lambda/4$ across the visible light region as a whole.

For the present invention, as the polarizing plate, it is possible to use not only an absorption type polarizing plate, which is obtained by stretching a dyed polymer film, but also a reflection type polarizing plate, which is obtained by alternately stacking a plurality of retardation films so that their phase retardation axial directions perpendicularly intersect. In such reflection type polarizing plate, for one polarized light, the refractive indexes of the layers are substantially the same, and thereby reflection of incident light does not occur at the interface between layers. For the other polarized light, the refractive indexes of the layers differ, and thereby incident light is reflected and returned at the interface of the retardation film. Alternatively, it is possible to use a wire grid-type polarizing plate, which is comprised of a film on which fine metal wires having a smaller width than the wavelength size are continuously arranged. Further, for the present invention, as the polarizing plate, it is possible to use not only the above such linear polarizing plate, but also a circular polarizing plate, which splits light to right handed circular polarized light and left handed circular polarized light.

Incidentally, the touch panel device of the second present invention further has, in addition to the above features of the touch panel device of the second present invention, the feature shown in relation to the touch panel device of the above first present invention, i.e. the feature wherein the difference of the minimum and maximum values of the planar-direction linear expansion coefficient of all polymer films located at the display device-side surface of the protective transparent substrate is $10.0 \times 10^{-6}$ cm/cm·° C. or less. Further, for the touch panel device of the second present invention, the description relating to the touch panel device of the first present invention may be referred to for the polymer films, protective transparent substrate, polymer films having position-detecting electrode layers, polymer film having a shielding electrode layer, display device-side protective transparent substrate, etc.

<Display Device Equipped with Touch Panel Device of Second Present Invention>

(First Aspect)

In a first aspect of a display device equipped with a touch panel device of the second present invention, the electrostatic capacitance-type touch panel device of the second present invention is located at the display surface of the display device via an air layer, the thickness of the air layer is 0.500 mm or less, 0.400 mm or less, 0.300 mm or less, 0.200 mm or less, or 0.100 mm or less, the display device uses polarized light for display, in particular linearly polarized light or circularly polarized light, and a retardation film having an approximately $\lambda/4$ retardation with respect to 550 nm wavelength light is located at the viewing-side surface of the display device.

According to the first aspect of a display device equipped with a touch panel device of the second present invention, the thickness of the air layer is thin, and thereby the display device equipped with a touch panel device has a small thickness; however, it is possible to prevent the formation of Newton rings.

Further, according to this display device equipped with the touch panel device, the display device uses polarized light for display, and a retardation film having an approximately $\lambda/4$ retardation with respect to 550 nm wavelength light is located at the viewing-side surface of the display device, so the polarized display light emitted from the display device passes through the viewing-side surface retardation film to undergo a $\lambda/4$ retardation, passes through the air layer, and again undergoes a $\lambda/4$ retardation at the touch panel device of the second present invention. According to this, the phase difference between the polarized light emitted from the display device and the polarized light undergoing the $\lambda/4$ retardation at the touch panel device becomes 0 or $\lambda/2$.

Specifically, when the display light from the display device is linearly polarized light, display light undergoes a $\lambda/4$ retardation at the retardation film on the display device, and further undergoes a $\lambda/4$ retardation at the touch panel device, and thereby becomes linear polarized light having the same angle or a 90° different angle from the linearly polarized light emitted from the display device. This display light undergoing two-time $\lambda/4$ retardations can be observed by a viewer through the transmission axis of the linear polarizing plate of the touch panel device. Further, when the display light from the display device is circularly polarized light, the display light undergoes a $\lambda/4$ retardation at the retardation film on the display device, and further undergoes a $\lambda/4$ retardation at the touch panel device, and thereby become circularly polarized light having the same or opposite direction to the cylindrically polarized light emitted from the display device. This display light undergoing two-time $\lambda/4$ retardations can be observed by a viewer through the transmission axis of the circular polarizing plate of the touch panel device.

Incidentally, in order to achieve this object, the angle between the absorption axis of the polarizing plate at the viewing side of the display device (i.e., the touch panel side) and the phase retardation axis of the $\lambda/4$ retardation film at the viewing-side surface of the display device can be within 45°±5°, particularly within 45°±1°. Further, the angle between the absorption axis of the polarizing plate at the viewing side of the liquid crystal display and the absorption axis of the polarizing plate of the touch panel device may be within 0°±5°, particularly within 0°±1°, or 90°±5° or more, and particularly within 90°±1°.

In the first aspect of a display device equipped with a touch panel device of the second present invention, the display device may in particular be a display device using inherently polarized display light, e.g. a liquid crystal display.

(Second Aspect)

In a second aspect of a display device equipped with a touch panel device of the second present invention, the electrostatic capacitance-type touch panel device of the second present invention is located at a display surface of a display device via an air layer. The thickness of the air layer is 0.500 mm or less, 0.400 mm or less, 0.300 mm or less, 0.200 mm or less, or 0.100 mm or less. The display device uses nonpolarized light for display.

According to a second aspect of a display device equipped with a touch panel device of the second present invention, the thickness of the air layer is thin, and thereby the display device equipped with a touch panel device has a small thickness; however, it is possible to prevent formation of Newton rings.

Further, according to the second aspect of this display device equipped with a touch panel device, the nonpolarized display light emitted from the display device passes through the air layer, and undergoes a $\lambda/4$ retardation at the touch panel device of the second present invention, but part of the nonpolarized display light passes through the transmission axis of the polarizing plate of the touch panel device, and can be viewed by a viewer.

In the second aspect of the display device equipped with a touch panel device of the second present invention, the display device may be any display device using inherently nonpolarized display light, e.g. an organic EL display, inorganic EL display, CRT display, field emission display (FED), electronic paper, or plasma display.

EXAMPLES

The various measurements in the examples were performed as follows:

<Linear Expansion Coefficient>

For the linear expansion coefficient of the film, a 4 mm width×30 mm sample was left at a temperature of 25° C. and a relative humidity of 50% for 24 hours, then a thermal stress-strain measuring device (SII Nanotechnology SS6100) was used for measurement three times by a temperature elevation rate of 5° C./min to calculate the linear expansion coefficient in the temperature range of 20° C. to 60° C. The average value was determined.

<Retardation>

A JASCO spectroellipsometer M220 was used to measure retardation with a light wavelength of 550 nm.

Reference Example

An electrostatic capacitance-type display device equipped with a touch panel device of a reference example was prepared to obtain the configuration as shown in FIG. 1. Specifically, the following procedure was performed to prepare the electrostatic capacitance-type display device equipped with a touch panel device of a reference example.

(1) Preparation of Electrostatic Capacitance-Type Display Device Equipped with Touch Panel Device 0.5 mm thickness Corning super-hard glass (10) was used as the protective transparent substrate. Through an acrylic resin adhesive (24), a first polymer film having a position-detecting electrode layer (20a, 22) was bonded thereto. Next, through an acrylic resin adhesive (34), the second polymer film having a position-detecting electrode layer (30a, 32) was bonded. Next, further, through an acrylic resin adhesive (44), an polymer film having an electromagnetic wave-shielding electrode layer (40, 42) was bonded to prepare an electrostatic capacitance-type touch panel device (100).

An adhesive was located on the 0.8 mm-thick edge parts of a liquid crystal display panel (300). The liquid crystal display panel (300) and the electrostatic capacitance-type touch panel device (100) were bonded via a 1.0 mm air layer (200).

The thus obtained electrostatic capacitance-type display device equipped with a touch panel device of the reference example is summarized in the following Table 1.

(2) Evaluation

The whole thickness of the display device equipped with a touch panel device of the reference example (touch panel device+air layer+liquid crystal panel) was 2.862 mm. The display device equipped with a touch panel device of the reference example had no Newton rings at ordinary temperature, and did not form Newton rings even at 50° C. However, this display device equipped with a touch panel device does not have an antireflection function. Therefore, when this display device was irradiated with a strong outside light, it became whitish and hard to see. The results are summarized in the following Table 5.

(3) First and Second Polymer Films Having Position-Detecting Electrodes (20a, 22; 30a, 32)

Each polymer film (20a, 30a) for the above first and second polymer films having position-detecting electrode layers (20a, 22; 30a, 32) was a 125 µm thick biaxially stretched polyethylene terephthalate (PET) film. The polymer film was not controlled in retardation, and thereby had a 1,000 nm or higher retardation. On each of the two surfaces of the polymer film, about 2 µm-thick hard coat layer mainly comprised of acrylic resin was coated (total 129 µm). On one surface of hard coat layers, an optical adjustment layer having a thickness of about 0.1 µm, which was mainly comprised of an organic siloxane-based resin comprising titanium oxide nanoparticles dispersed therein, was arranged. Further, on this optical adjustment layer, about 20 µm-thick indium-tin oxide (ITO) was formed by sputtering. The optical adjustment layer is for preventing the electrode patterns of indium-tin oxide from been recognized.

This polymer film having an indium-tin oxide layer was cut into a size suitable for bonding it with a 3.0 inch square liquid crystal display panel, and was patterned for electrodes. Further, it was heat treated at 130° C. for 90 minutes to make this indium-tin oxide layer crystallize, and thereby form a position-detecting electrode layer (22, 32). Thus, the first and second polymer films having position-detecting electrode layers (20a, 22; 30a, 32) were formed.

The crystallized indium-tin oxide layer had a surface resistance value of 200 Ω/square. The polyethylene terephthalate film used as the substrate had a linear expansion coefficient in the flow direction of $37 \times 10^{-6}$ cm/cm·° C., and a linear expansion coefficient in a direction vertical to the flow direction of $34 \times 10^{-6}$ cm/cm·° C.

(4) Polymer Film Having an Electromagnetic Wave-Shielding Electrode Layer (40, 42)

The polymer film (40) for the above polymer film having an electromagnetic wave-shielding electrode layer (40, 42) was a 100 µm-thick unstretched polycarbonate (PC) film prepared by the flow casting method. This polymer film had a retardation of substantially 0 nm. On each of the two surfaces of this polymer film, about 2 µm-thick hard coat layer mainly comprised of acrylic resin was coated (total 104 µm). On one of the hard coat layers, about 20 µm-thick indium-tin oxide (ITO) was formed by sputtering.

This polymer film having an indium-tin oxide layer was cut into a size suitable for bonding it with a 3.0 inch square liquid crystal display panel. It was heat treated at 130° C. for 90 minutes to make this indium-tin oxide layer crystallize, and thereby form an electromagnetic wave-shielding electrode layer (42). Thus, an polymer film having an electromagnetic wave-shielding electrode layer (40, 42) was formed.

The crystallized indium-tin oxide layer had a surface resistance value of 200 Ω/square. The polycarbonate film used as a substrate had linear expansion coefficients in both the flow direction and the direction vertical to flow direction of $75 \times 10^{-6}$ cm/cm·° C.

(5) Liquid Crystal Display Panel (300)

The liquid crystal display panel was VA (vertical alignment) type of liquid crystal display panel having a screen size of 3.0 inch and thickness of 0.8 mm. The display panel was comprised of a 0.6 mm-thick liquid crystal cell, and an optical compensation film and polarizing plate bonded to both surfaces thereof.

Comparative Example

Figure 2:
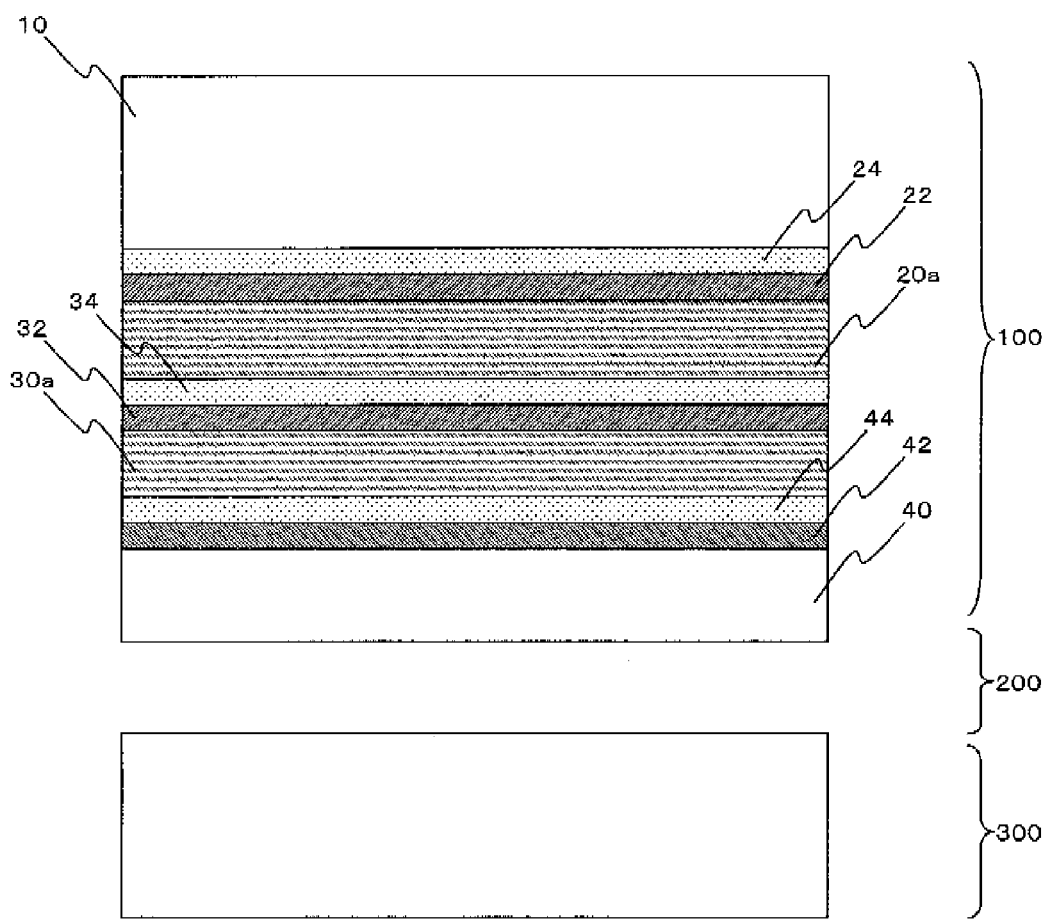
FIG. 2 is a conceptual view showing the configuration of a display device equipped with a touch panel device of a comparative example.

The electrostatic capacitance-type display device equipped with a touch panel device of a comparative example was prepared to obtain the configuration as shown in FIG. 2. Specifically, the following procedure was performed to prepare the electrostatic capacitance-type display device equipped with a touch panel device of the comparative example.

(1) Preparation of Electrostatic Capacitance-Type Display Device Equipped with Touch Panel Device Except for making the thickness of the air layer between the liquid crystal display panel (300) and the electrostatic capacitance-type touch panel device (100) smaller, specifically, for making the thickness of the air layer as small as 0.1 mm rather than 1 mm, the same procedure was repeated as the reference example to prepare an electrostatic capacitance-type display device equipped with a touch panel device of the comparative example.

The thus obtained electrostatic capacitance-type display device equipped with a touch panel device of the comparative example is summarized in the following Table 2.

(2) Evaluation

The display device of the comparative example had an overall thickness of 1.962 mm, which was thinner than the reference example by about 0.900 mm. The display device equipped with a touch panel device of the comparative example did not form Newton rings at ordinary temperature, but formed Newton rings at 50° C. Further, this display device equipped with a touch panel device did not have an antireflection function. Therefore, when this display device was irradiated with a strong outside light, it became whitish and hard to see. The results are summarized in the following Table 5.

Example 1

Figure 3:
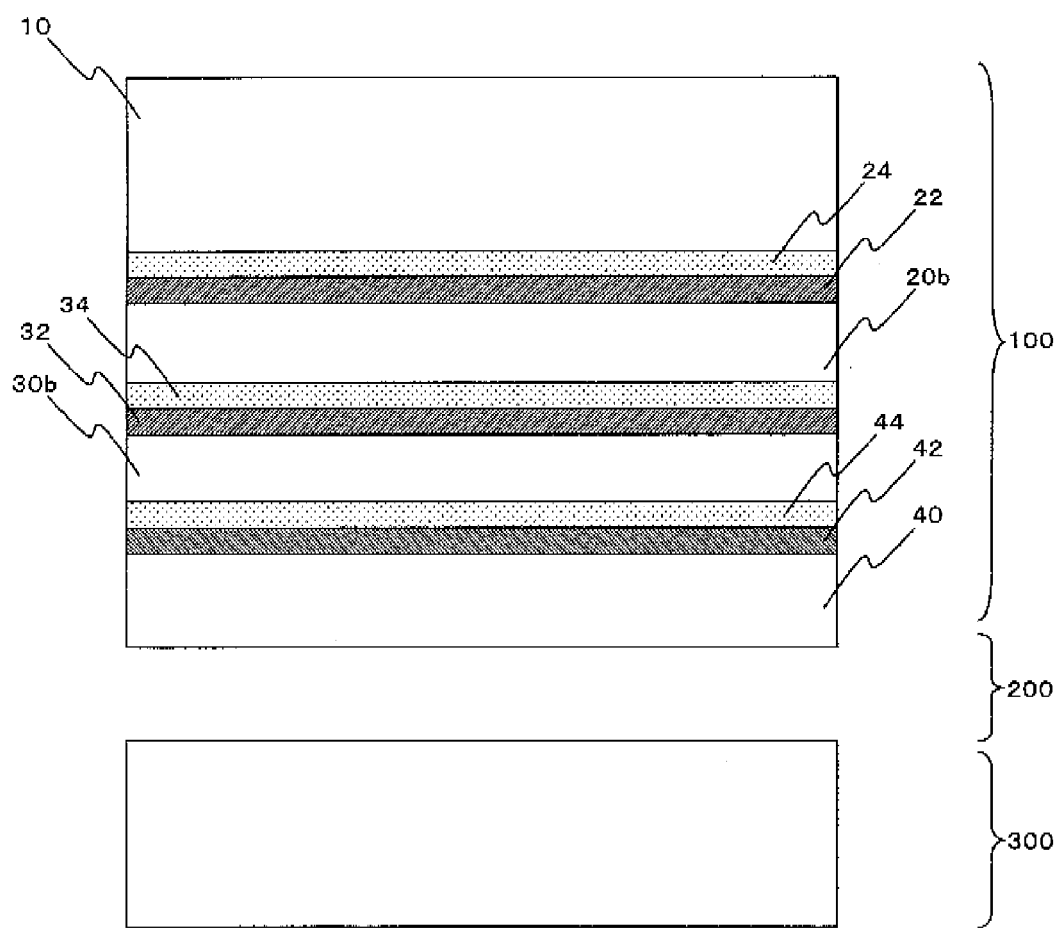
FIG. 3 is a conceptual view showing the configuration of a display device equipped with a touch panel device of Example 1.

The electrostatic capacitance-type display device equipped with a touch panel device of Example 1 was prepared to obtain the configuration as shown in FIG. 3. Specifically, the following procedure was performed to prepare the electrostatic capacitance-type display device equipped with a touch panel device of Example 1.

(1) Preparation of Electrostatic Capacitance-Type Display Device Equipped with Touch Panel Device Except for using first and second polymer films having position-detecting electrode layers (20b, 22; 30b, 32) and made of unstretched polycarbonate (PC) films (20b, 30b), instead of first and second polymer films having position-detecting electrode layers (20a, 22; 30a, 32) and made of biaxially stretched polyethylene terephthalate (PET) films (20a, 30a), the same procedure was repeated as the comparative example to prepare an electrostatic capacitance-type display device equipped with a touch panel device of Example 1.

The thus obtained electrostatic capacitance-type display device equipped with a touch panel device of Example 1 is summarized in the following Table 3.

(2) Evaluation

The display device of Example 1 had an overall thickness of 1.912 mm, which was thinner than the reference example by about 0.950 mm. The display device equipped with a touch panel device of Example 1 did not form Newton rings at ordinary temperature, and did not form Newton rings at 50° C. However, this display device equipped with a touch panel device did not have an antireflection function. Therefore, when this display device was irradiated with a strong outside light, the display device became whitish and hard to see. The results are summarized in the following Table 5.

(3) First and Second Polymer Films Having Position-Detecting Electrode Layers (20b, 22; 30b, 32)

Except for using a 100 μm-thick unstretched polycarbonate (PC) film prepared by the flow casting method, instead of a 125 μm-thick biaxially stretched polyethylene terephthalate (PET) film, the same procedure was used as the first and second polymer films having position-detecting electrode layers (20a, 22; 30a, 32) of the reference example to obtain polymer films (20b, 30b) for the above first and second polymer films having position-detecting electrode layers (20b, 22; 30b, 32).

The crystallized indium-tin oxide layer had a surface resistance value of 200 Ω/square. The polycarbonate films used as a substrate had linear expansion coefficients in both the flow direction and the direction vertical to the flow direction of $75 \times 10^{-6}$ cm/cm·° C.

Example 2

Figure 4:
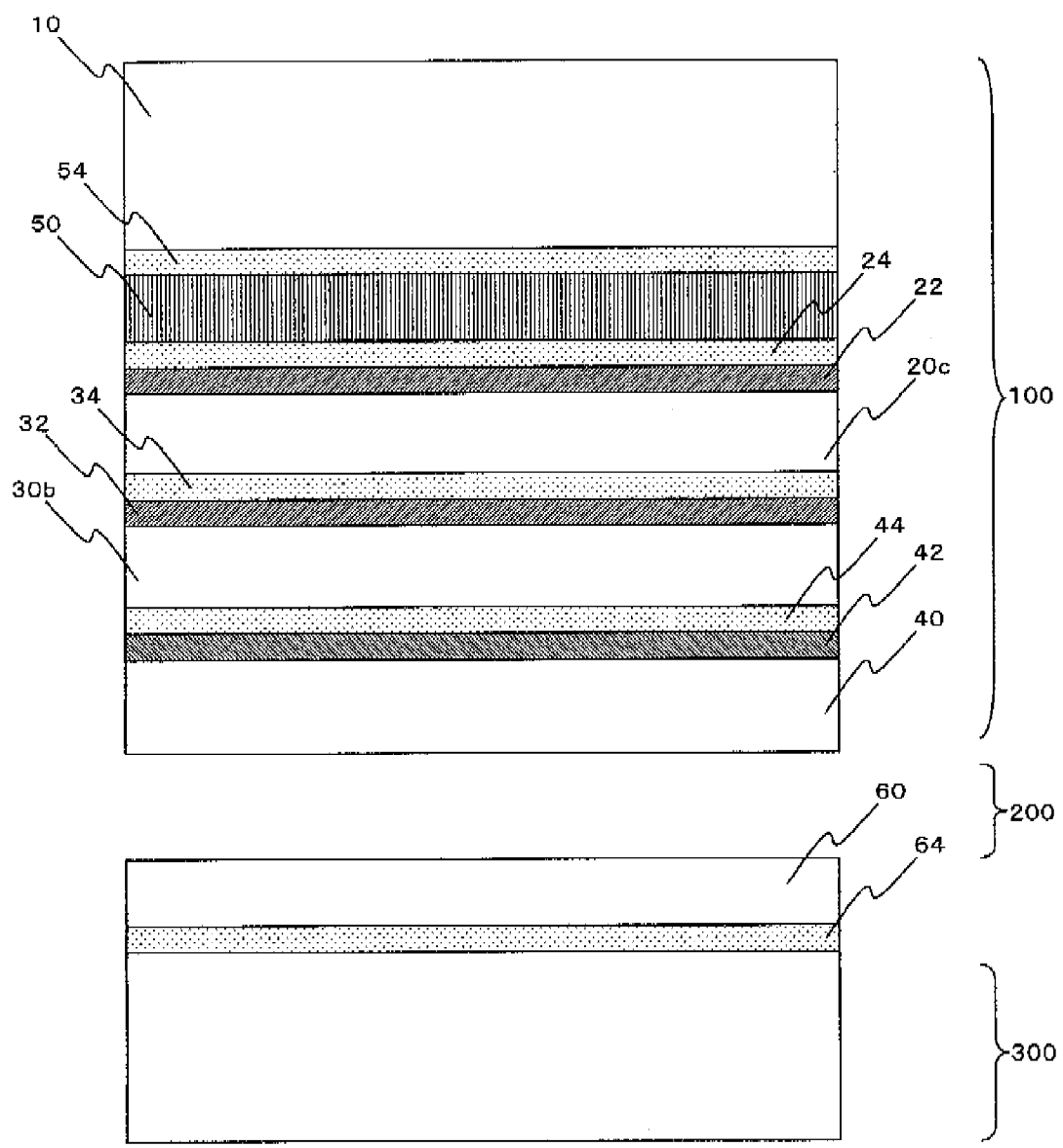
FIG. 4 is a conceptual view showing the configuration of a display device equipped with a touch panel device of Example 2.

The electrostatic capacitance-type display device equipped with a touch panel device of Example 2 was prepared to obtain the configuration as shown in FIG. 4. Specifically, the following procedure was performed to prepare the electrostatic capacitance-type display device equipped with a touch panel device of Example 2.

(1) Preparation of Electrostatic Capacitance-Type Display Device Equipped with Touch Panel Device The same procedure was repeated as Example 1 to prepare an electrostatic capacitance-type display device equipped with a touch panel device of Example 2, excepting the followings: a 100 μm-thick polarizing film was bonded, through an adhesive comprised of acrylic resin, between a protective transparent substrate of 0.5 mm-thick Corning super-hard glass and a first polymer film having a position-detecting electrode layer (20a, 22); a first polymer film (20c, 22) having a position-detecting electrode layer and made of a monoaxially stretched polycarbonate (PC) film (20c) was used instead of the first polymer film (20b, 22) having a position-detecting electrode layer and made of an unstretched polycarbonate (PC) film (20b); and a monoaxially stretched polycarbonate film (60), which was similar to the monoaxially stretched polycarbonate film (20c), was bonded to the surface of the liquid crystal display panel (300) through an acrylic adhesive (64).

The thus obtained electrostatic capacitance-type display device equipped with a touch panel device of Example 2 is summarized in the following Table 2.

(2) Evaluation

The display device of Example 2 had an overall thickness of 2.012 mm, which was thinner than the reference example by about 0.850 mm. The display device equipped with a touch panel device of Example 2 did not form Newton rings at ordinary temperature, and did not form Newton rings at 50° C. Further, this display device equipped with a touch panel device had an antireflection function, so even when this display device is irradiated with a strong outside light, the display device did not become whitish. The results are summarized in the following Table 5.

(3) Polarizing Film (50)

The above polarizing film (50) used comprised a substrate made of cellulose triacetate and having a retardation of substantially 0 nm, which was prepared by the flow casting method, and a polarizing plate made of an iodine-adsorbed polyvinyl alcohol layer bonded to the substrate. The polarizing film was cut so as to align its absorption axis with the absorption axis of the polarizing plate located on the top surface of the liquid crystal display panel (on the side bonded with touch panel device) (i.e. such that the angle formed by the absorption axes became 0 degree). This polarizing film had a linear expansion coefficient in the absorption axis direction of $74 \times 10^{-6}$ cm/cm·° C. and a linear expansion coefficient in a direction vertical to flow direction of $78 \times 10^{-1}$ cm/cm·° C.

(4) First Polymer Film Having a Position-Detecting Electrode Layer (20c, 22)

The polymer film (20c) for the above first polymer film having a position-detecting electrode layer (20c, 22) was a film obtained by monoaxially stretching a 100 μm-thick unstretched polycarbonate (PC) film prepared by the flow casting method. This film had a retardation at 550 nm of 138 nm (i.e. ¼ retardation of wavelength). The same procedure was performed as the first and second polymer films having position-detecting electrode layers (20a, 22; 30a, 32) of the reference example to obtain the first polymer film having a position-detecting electrode layer (20c, 22), excepting that the above monoaxially stretched polycarbonate (PC) film (20c) was used instead of the first polymer film having a position-detecting electrode layer (20a, 22; 30a, 32) and made of the biaxially stretched polyethylene terephthalate (PET) film (20a, 30a), and that the monoaxially stretched polycarbonate (PC) film (20c) was cut such that the angle formed by the absorption axis of the polarizing plate located on the top surface of the liquid crystal display panel (on the side bonded with touch panel device) and the phase retardation axis of the first polymer film having a position-detecting electrode layer (20c, 22) became 45 degrees.

The crystallized indium-tin oxide layer had a surface resistance value of 200 Ω/square. The monoaxially stretched polycarbonate film used as the substrate had a linear expansion coefficient in the flow direction of $74 \times 10^{-6}$ cm/cm·° C. and a linear expansion coefficient in a direction vertical to the flow direction of $77 \times 10^{-6}$ cm/cm·° C.

TABLE 1

Display Device Equipped with Touch Panel Device of Reference Example

| | | Material | Thickness (mm) | Linear expansion coefficient (×10⁻⁶ cm/cm·°C.) | Retardation (mm) |
|---|---|---|---|---|---|
| Touch panel device | Viewing side transparent substrate | Glass | 0.500 | 5 | — |
| | Adhesive layer | Acryl | 0.100 | — | — |
| | Polymer film having a position-detecting electrode layer | PET (biaxially stretched) | 0.129 | 34 to 37 | 1000 or more (not controlled) |
| | Adhesive layer | Acryl | 0.050 | — | — |
| | Polymer film having a position-detecting electrode layer | PET (biaxially stretched) | 0.129 | 34 to 37 | 1000 or more (not controlled) |
| | Adhesive layer | Acryl | 0.050 | — | — |
| | Polymer film having an electromagnetic wave-shielding electrode layer | PC (unstretched) | 0.104 | 75 | About 0 |
| Air layer | | — | 1.000 | — | — |
| Liquid crystal panel | | — | 0.800 | — | — |

TABLE 2

Display Device Equipped with Touch Panel Device of Comparative Example

| | | Material | Thickness (mm) | Linear expansion coefficient (×10⁻⁶ cm/cm·°C.) | Retardation (mm) |
|---|---|---|---|---|---|
| Touch panel device | Viewing side transparent substrate | Glass | 0.500 | 5 | — |
| | Adhesive layer | Acryl | 0.100 | — | — |
| | Polymer film having a position-detecting electrode layer | PET (biaxially stretched) | 0.129 | 34 to 37 | 1000 or more (not controlled) |
| | Adhesive layer | Acryl | 0.050 | — | — |
| | Polymer film having a position-detecting electrode layer | PET (biaxially stretched) | 0.129 | 34 to 37 | 1000 or more (not controlled) |
| | Adhesive layer | Acryl | 0.050 | — | — |
| | Polymer film having an electromagnetic wave-shielding electrode layer | PC (unstretched) | 0.104 | 75 | About 0 |
| Air layer | | — | 0.100 | — | — |
| Liquid crystal panel | | — | 0.800 | — | — |

TABLE 3

Display Device Equipped with Touch Panel Device of Example 1

| | | Material | Thickness (mm) | Linear expansion coefficient (×10⁻⁶ cm/cm·°C.) | Retardation (mm) |
|---|---|---|---|---|---|
| Touch panel device | Viewing side transparent substrate | Glass | 0.500 | 5 | — |
| | Adhesive layer | Acryl | 0.100 | — | — |
| | Polymer film having a position-detecting electrode layer | PC (unstretched) | 0.104 | 75 | About 0 |
| | Adhesive layer | Acryl | 0.050 | — | — |
| | Polymer film having a position-detecting electrode layer | PC (unstretched) | 0.104 | 75 | About 0 |
| | Adhesive layer | Acryl | 0.050 | — | — |
| | Polymer film having an electromagnetic wave-shielding electrode layer | PC (unstretched) | 0.104 | 75 | About 0 |
| Air layer | | — | 0.100 | — | — |
| Liquid crystal panel | | — | 0.800 | — | — |

TABLE 4

Display Device Equipped with Touch Panel Device of Example 2

| | | Material | Thickness (mm) | Linear expansion coefficient (×10⁻⁶ cm/cm·°C.) | Retardation (mm) |
|---|---|---|---|---|---|
| Touch panel device | Viewing side transparent substrate | Glass | 0.500 | 5 | — |
| | Adhesive layer | Acryl | 0.050 | — | — |
| | Polarizing plate | Cellulose triacetate | 0.100 | 74 to 78 | About 0 |
| | Adhesive layer | Acryl | 0.050 | — | — |
| | Polymer film having a position-detecting electrode layer | PC (monoaxially stretched) | 0.104 | 74 to 77 | λ/4 |
| | Adhesive layer | Acryl | 0.050 | — | — |
| | Polymer film having a position-detecting electrode layer | PC (unstretched) | 0.104 | 75 | About 0 |
| | Adhesive layer | Acryl | 0.050 | — | — |
| | Polymer film having an electromagnetic wave-shielding electrode layer | PC (unstretched) | 0.104 | 75 | About 0 |
| Air layer | | — | 0.100 | — | — |
| Liquid crystal panel | | — | 0.800 | — | — |

TABLE 5

| | Ref. ex. | Comp. ex. | Ex. 1 | Ex. 2 |
|---|---|---|---|---|
| Difference of linear expansion coefficient in | 41 | 41 | 0 | 4 |

TABLE 5-continued

|  | Ref. ex. | Comp. ex. | Ex. 1 | Ex. 2 |
| --- | --- | --- | --- | --- |
| planar direction (×10⁻⁶ cm/cm·°C.) | | | | |
| Total retardation | Not controlled (several 1000 nm) | Not controlled (several 1000 nm) | 0 | λ/4 |
| Overall thickness (mm) (difference from ref. ex. (mm)) | 2.862 (—) | 1.962 (0.900) | 1.912 (0.950) | 2.012 (0.850) |
| Newton rings Ordinary temp. | Good | Good | Good | Good |
| Newton rings 50° C. | Good | Poor | Good | Good |
| Antireflection function | Poor | Poor | Poor | Good |

REFERENCE SIGNS LIST

10: Protective transparent substrate
20a, 20b, 20c, 30a, 30b: Polymer film having a position-detecting electrode layer
22, 32: Position-detecting electrode layer
40: Polymer film having a shielding electrode layer
42: Shielding electrode layer
50: Polarizing plate
60 Retardation film (λ/4 film)
24, 34, 44, 54, 64: Adhesive
100: Touch panel device
200: Air layer
300: Display device

The invention claimed is:

1. An electrostatic capacitance-type touch panel device, comprising a protective transparent substrate having a viewing-side surface and a display device-side surface, and two polymer films having position-detecting electrode layers and other polymer film, which are located at the display device-side surface of the protective transparent substrate, wherein the protective transparent substrate is a glass substrate;

wherein a difference between minimum and maximum values of a planar-direction linear expansion coefficient of all polymer films, including said two polymer films having position-detecting electrode layers and said other polymer film, located at the display device-side surface of the protective transparent substrate is $10.0 \times 10^{-6}$ cm/cm·° C. or less and wherein said electrostatic capacitance-type touch panel device comprises, as said other polymer film, a polarizing plate located at the display device-side surface of said protective transparent substrate, and a total retardation of all layers located at the display device side from said polarizing plate is approximately λ/4 with respect to 550 nm wavelength light.

2. The touch panel device according to claim 1, wherein the device further comprises, as said other polymer film, a polymer film having a shielding electrode layer and located at a display device-side surface of said protective transparent substrate, and wherein said polymer film having a shielding electrode layer is located at the display device side from said two polymer films having position-detecting electrode layers.

3. A display device equipped with the electrostatic capacitance-type touch panel device according to claim 2, wherein said electrostatic capacitance-type touch panel device is arranged on the display surface of said display device via an air layer, and the thickness of the air layer is 0.500 mm or less.

4. A display device equipped with the electrostatic capacitance-type touch panel device according to claim 1, wherein said electrostatic capacitance-type touch panel device is arranged on the display surface of said display device via an air layer, and the thickness of the air layer is 0.500 mm or less.

* * * * *